Sept. 12, 1961 F. J. HAMMES 2,999,952

SYNCHRONOUS MOTOR

Filed June 10, 1960 2 Sheets-Sheet 1

*INVENTOR.*
FREDERIC J. HAMMES
*BY*
Busser, Smith & Harding
ATTORNEYS

*INVENTOR.*
FREDERIC J. HAMMES
*BY*
Busser, Smith & Harding
ATTORNEYS

United States Patent Office 2,999,952
Patented Sept. 12, 1961

2,999,952

SYNCHRONOUS MOTOR

Frederic J. Hammes, R.D. 1, Birdsboro, Pa., assignor of one-half to Dorothy C. Hammes, Birdsboro, Pa., and one-fourth to John A. Stinson, Jensen Beach, Fla.

Filed June 10, 1960, Ser. No. 35,264
9 Claims. (Cl. 310—154)

This invention relates to an electric motor and more particularly to a self-starting synchronous motor employing a permanent magnet stator and a wound rotor.

This is a continuation-in-part of my copending application Serial No. 626,997, filed December 7, 1956, now abandoned.

Various types of permanent magnet electric machines are old in the art. These machines are variously used as magnetos, generators or motors and involve various arrangements of permanent magnet stators and/or permanent magnet rotors. However, it is the primary object of the present invention to provide a small self-starting synchronous motor having stator poles which are magnetized by a permanent magnet.

It is a further object of the invention to provide a self-starting synchronous motor having increased starting torque and improved life of the permanent magnet energized poles.

It is a further object of the invention to provide an improved coil carrying rotor construction for use with a permanent magnet stator formed with eccentric pole surfaces.

These and other objects of the invention having to do particularly with the construction and operation thereof will become evident from the following description when read in conjunction with the accompanying drawing in which.

Figure 1:
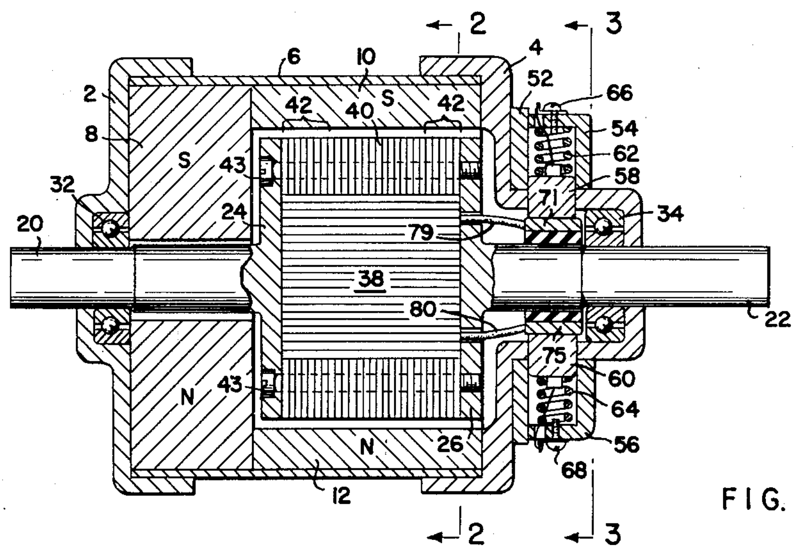
FIGURE 1 is a longitudinal axial section through a motor embodying the invention.

The motor includes a housing formed of a pair of opposed end bells 2 and 4 between which is retained a cylindrical member 6. The end bells 2 and 4 and the cylindrical member 6 are each formed of non-magnetic material such as, for example, aluminum or brass. An annular member 8 is positioned adjacent to the bell 2 and is in the form of a disc provided with a radially central bore for the passage of the rotor shaft as will hereinafter be described. The member 8 is formed of "Alnico" or other suitable material capable of retaining a high degree of magnetization. The member 8 is magnetized with opposing polarities on opposite sides of a longitudinal plane passing through the radial center of the member and passing through the parts 14 shown in FIGURE 2 and which will be hereinafter described. Two opposed magnetic cylindrical segments 10 and 12 are positioned in engagement with one radial face of the member 8 and extend between the member 8 and the bell 4. The segments 10 and 12 are separated along their adjacent longitudinal edges by strips of insulating material shown at 14 which extend between the member 8 and the bell 4. The bells 2 and 4 are retained in engagement with the member 8, the segments 10 and 12, and the cylindrical member 6 by suitable means such as bolts or the like not shown in the drawings.

Figure 2:
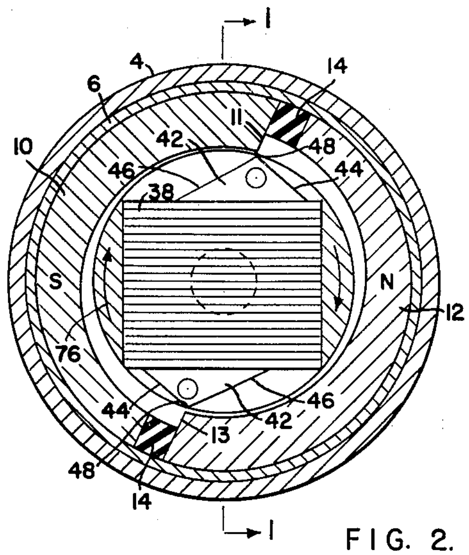
FIGURE 2 is a radial section taken on the trace 2, 2 in FIGURE 1.

As is best shown in FIGURE 2, the inner surfaces of the cylindrical segments 10 and 12 are formed eccentrically with respect to the center of rotor rotation thus providing a shoulder 11 at the end portion of the segment 10 having minimum radius and a shoulder 13 at the end portion of the segment 12 having minimum radius. It will be evident that the arrangement described provides in the form of segments 10 and 12 a pair of opposed pole pieces which are oppositely magnetized. These pole pieces are preferably formed of a magnetic material of a type similar to that from which coil laminations are conventionally formed and which has a high degree of conductivity but a low degree of magnetic retention.

Figure 6:
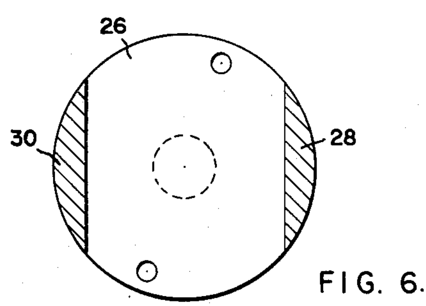
FIGURE 6 is a radial section of FIGURE 5 taken on the trace 6, 6.
Figure 4:
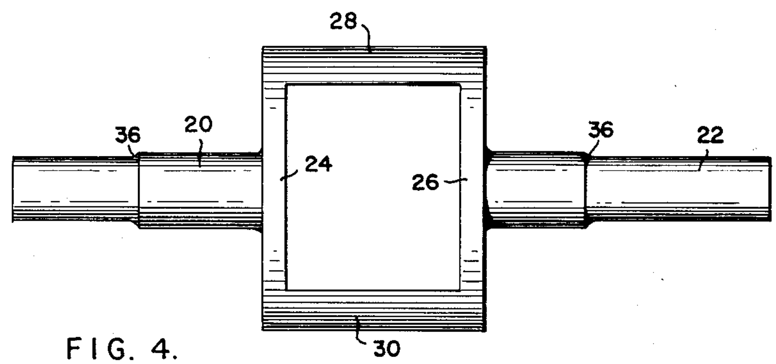
FIGURE 4 is a top view of the rotor shaft with the rotor coils and laminations removed therefrom.
Figure 5:
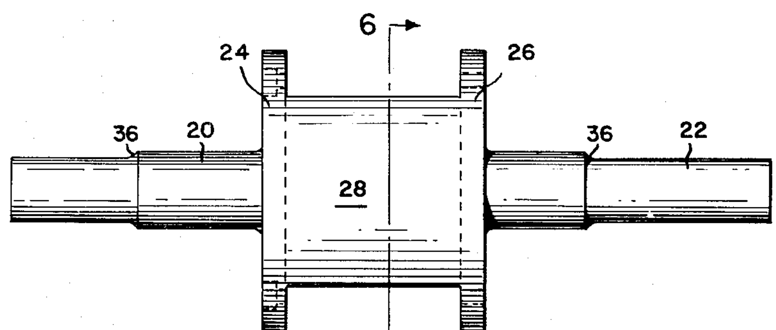
FIGURE 5 is a side view of the part shown in FIGURE 4.

The rotor is mounted in a non-magnetic frame best illustrated in FIGURES 4, 5 and 6 which includes a pair of interrupted shaft lengths 20 and 22 the adjacent ends of which are formed with discs 24 and 26 which are joined together by longitudinally extending members 28 and 30 which are oppositely positioned at radially outermost portions of the discs 24 and 26. These members, as best shown in FIGURE 6, are of cylindrical formation over their outer surfaces and are of plane parallel formation over their inner surfaces. This assembly is formed of non-magnetic material and mounted for rotation within the stator assembly previously described by means of bearings 32 and 34 mounted in the end bells 2 and 4, respectively. The shafts 20 and 22 are provided with shoulders 36 in order to restrict longitudinal movement of the shaft within the stator assembly by virtue of engagement of the shoulders with the bearings 32 and 34. Certain advantages of the above frame structure will appear hereafter.

A coil 38 is positioned over a stack of laminations 40 which extend beyond the ends of the coil and, in combination with additional laminations 42 positioned over the shoulders of the coil 38, are mounted between the discs 24 and 26 by means of bolts 43 extending between the discs. The rotor coil laminations have their end portions extending beyond the coil 38 as indicated by the numerals 42 in FIGURE 2 and these end portions are each formed with a pair of relatively inclined surfaces 44 and 46 meeting along a narrow circumferential surface 48 forming the radially outermost portion of the rotor laminations. The surfaces 44, which extend generally in the direction of reducing radius of the stator surfaces, are so arranged as to form a smaller angle with a tangent at the center of the narrow circumferential surface 48 than is formed with said tangent by the surface 46. The purpose of this particular surface formation in combination with the eccentrically formed stator surfaces will be hereinafter described.

Figure 3:
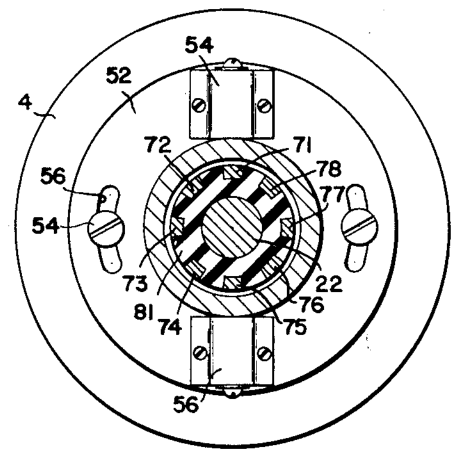
FIGURE 3 is a radial section taken on the trace 3, 3 in FIGURE 1.
Figure 7:
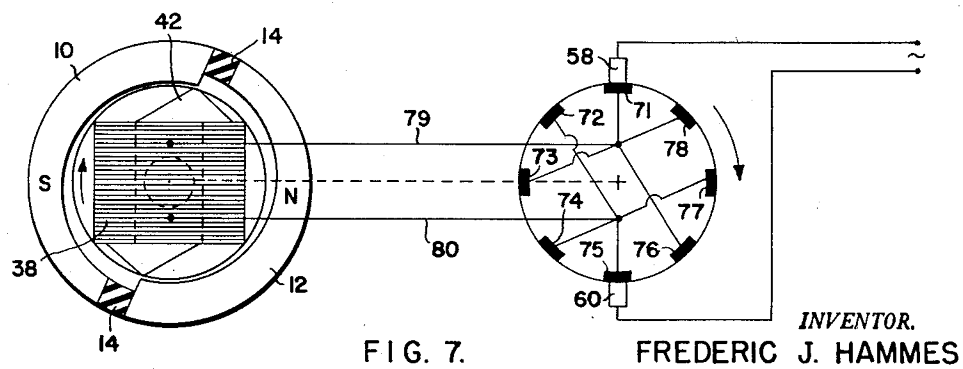
FIGURE 7 is a diagram, partly schematic, illustrating the wiring of the rotor.

A disc 52 is positioned for rotational adjustment on the outside face of the end bell 4 by means of screws 54 passing through slots 56 in the disc 52. The disc 52 supports brush holders 54 and 56 which are movable therewith and within which brushes 58 and 60 are urged radially inwardly by springs 62 and 64, respectively. Screws 66 and 68 are provided in the outer surfaces of the holders 54 and 56, respectively, each being connected by a means of a conductor to the brush in its associated brush holder, and are provided for connection to an external alternating current power source (FIGURE 7). The brushes 58 and 60 bear upon a commutator assembly comprising commutator segments numbered 71 to 79 inclusive, mounted in a body of insulating material 81 positioned on the shaft 22. Upon viewing FIGURE 3 it will be evident that the width of the brushes 58 and 60 is selected so as to be not greater than the width of the insulation between the commutator segments 71 to 79.

Referring to FIGURE 7, the coil 38 is connected to the commutator segments by main leads or conductors 79 and 80. The commutator segments are wired for connection to coil 38, through main leads 79 and 80, in such a manner that successive segments are connected to opposite ends of coil 38, with the exception that a reversal of polarity at the desired stage of rotation is effected by the connection of two successive segments to the same end of the coil. Thus the adjacent commutator segments 71 and 78 both are wired to the same end of coil 38 via main lead 79. The next segment 77, however, is wired to the other end of coil 38 via main lead 80. Segment 76 is wired to lead 79 while segment 75 is wired to lead 80. The next segment, 74, also is wired to lead 80. Again, the connections of segments 73 and 72 to coil 38 are alternated; that is, segment 73 is wired to lead 79 and segment 72 is wired to lead 80. Opposite segments of the commutator, e.g. 71 and 75, are to be considered as pairs, the brushes 58 and 60 being adapted to engage simultaneously one of these pairs. The segments comprising each of the pairs of segments are, of course, connected to opposite ends of the coil 38. FIGURE 7 illustrates the armature in its rest position as shown also in FIGURES 2 and 3, with surfaces 48 adjacent shoulders 13 and with brushes 58 and 60 resting on segments 71 and 75.

The permanent magnet 8 will cause the magnetic segments 10 and 12 to be magnetized and provide a field across the air gap and through the metallic laminations around which the armature is wound. As previously described, the stator segments 10 and 12 are eccentrically positioned with respect to the motor axis and, when the motor is disconnected from its power source, magnetic attraction will give rise to a torque tending to rotate the rotor to the point of maximum magnetic reluctance. During such rotation the gaps between the outermost rotor portions 48 and the respective segments 10 and 12 are progressively decreased until finally the rotor comes to rest in the position shown in FIGURE 2, which is the point of maximum reluctance. It will be noted also that when the rotor is displaced from its FIGURE 2 position the air gaps between surfaces 44 and adjacent segments 10 or 12 are less than the air gaps between surfaces 46 and the adjacent segments. The torque tending to rotate the rotor to its illustrated rest position is, thereby, enhanced. In the latter phenomenon there is involved the fact that the shortest magnetic paths between the rotor laminations and the stator segments will be deviated slightly from a radial direction.

With commutator segments 71 and 75 contacting brushes 58 and 50, in the rest position, when the brushes are connected to a suitable source of alternating current the coil 38 will be energized.

Upon the first half cycle of alternating current serving to energize the rotor to provide the upper end of the rotor laminations, as viewed in FIGURE 2, with a south magnetic polarization the uppermost end of the rotor will be repelled from the segment 10 and attracted to the segment 12. A reverse effect will, of course, be imposed on the lower end of the rotor laminations as viewed in FIGURE 2. A rotor torque will thus be produced and the rotor will commence to rotate. If, by a sufficiently early portion of the next half cycle of alternating current, the rotor has rotated sufficiently to bring the brushes into contact with commutator segments 72 and 76, the polarity of energization of the coil will remain the same and thus the forces producing torque upon the rotor will continue in the same direction causing additional rotation of the rotor. The polarity will remain the same, of course, due to the reversal of connection of coil 38 to the power source, it being noted, for example, that in the first-mentioned half cycle lead 79 was connected by segment 71 to brush 58, while in the next mentioned half cycle it is connected by segment 72 to brush 60. A further reversal in the connection of coil 38 to the power source will take place as brushes 58 and 60 come into contact with commutator segments 73 and 77, and again as they contact segments 74 and 78. Following energization of coil 38 by contact of the brushes with 74 and 78, the rotor again will be approaching, in a clockwise direction, a position (such as in FIGURE 2) wherein the outermost rotor portions 48 are adjacent shoulders 11 and 13 of the stator segments. The polarity of coil 38 at this time still is such as to attract the upper end thereof to the south stator segment 10 and to repell the south segment 12. However, as the outermost rotor portions 48 pass by shoulders 11 and 13, it is desired to reverse the polarity in coil 38 to effect an attraction of the upper end thereof to north stator segment 12. Accordingly, at this time a reversal of the coil connection, as previously described, does not take place, because the pair of commutator segments 71 and 75, next in succession, are connected respectively to the same ends of coil 38 as the pair of segments 74 and 78 (FIGURE 7). Therefore, as the rotor portions 48 pass shoulders 11 and 13, the polarity becomes such as to repell the upper end thereof from the south stator segment 10 and to attract the upper end to the north segment 12. The next half cycle or revolution of operation is identical with that just described. It will be seen from the above that the rotor in effect has a pulsating direct current of one polarity imposed therein during a portion of its rotation represented by one of the stator segments, and a pulsating direct current of opposite polarity during the remaining portion (approximately one-half revolution) of rotation represented by the other stator segment.

During the first half cycle of energization of the rotor coil the rotor is accelerating and it is expected that it will not have reached the one-eighth point (segments 72 and 76) in its rotation prior to the end of the first half cycle of alternating currents. It will, however, be sufficiently close to this degree of rotation to provide for the commutator switching to take place at an early portion of the second half cycle. Thereafter the motor may tend to run ahead of itself, i.e., it will have completed the necessary degree of rotation prior to each commutator change in order that the maximum speed without loading is controlled by the fact that the motor for the final portion of each half cycle of current flow therethrough has rotated somewhat beyond the point of field polarity change. This bucking condition tends to limit the rotor speed and current, but is probably not existant for the first few cycles of operation of the motor. Thus, if the rotor coils are wound with a properly selected number of turns and wire diameter, the current carried by the rotor during the first few half cycles will be substantially greater than the current carried during running of the motor. This increased current will, of course, give rise to increased rotor field strengths and thus cause the motor to pull into synchronism during the first two half cycles of rotor energization. The rotor will thereafter remain in synchronism with a rotor current having somewhat lesser peak values than occur during the first two half cycles unless the motor is heavily loaded. It will be evident that while the particular commutator arrangement and pole arrangement shown in the drawing provides a two pole machine rotating at one revolution for every four cycles of alternating current supplied thereto, various commutator arrangements may be employed in order to vary the motor speed if desired.

It should be noted that the motor can start rotating in only one direction, i.e., clockwise in FIGURE 2. If the first half cycle of alternating current energizes the rotor coil to attract, rather than repel, the upper end to the south stator segment, the torque will be opposed to the previously mentioned tendency of the rotor to rotate to the point of maximum magnetic reluctance. Hence there will be no appreciable rotation, if any, in a counterclockwise direction prior to the next half cycle of alternating current, which will drive the rotor clockwise with sufficient torque to initiate motor operation.

An advantage of the offset rotor tips (48) is that the rotor is driven largely by the action of magnetic attraction, as opposed to repulsion, with resultant improved efficiency and reduction in demagnetization of the permanent field magnets. At the point (11 and 13) of reversal of polarity, the forward surfaces 44 are in close proximity to the adjacent stator segments, while in transition from one such segment to the next the trailing surfaces 46 are rapidly widening the gaps between them and the respective stator segments. The force by magnetic attraction begins immediately, and the force by magnetic repulsion diminishes rapidly. The efficency is improved since apparently the current necessary for prolonged repulsion is decreased. The above features are in comparison to ordinary two-pole machines wherein the rotor must be driven through ninety degrees or more by repulsion before it enters into definite attraction of the next opposite field.

The motor stator, as previously described, involves a permanentt magnet member 8 in the form of a disc and cylindrical segment 10 and 12 made of magnetic material having a relatively low magnetic retentivity. This arrangement is particularly desirable for the reason that the high intensity magnet is insulated from the magnetic field localizing effects of the radially outer portions 48 of the rotor. This rotor construction gives rise to an extremely high intensity localized field and such a field passing over a permanent magnet tends to disarrange the molecular structure and reduce the degree of permanent magnetization of the magnet. This is particularly true when, as in the present instance, there may occur conditions of magnetic repulsion and conditions of magnetic attraction over closely adjacent areas of a magnetic member magnetized at a single polarity. The cylindrical segments having a low degree of magnetic retention do not retain any magnetization and thus do not suffer unwanted rearrangement of magnetization. The segments are repeatedly remagnetized in the desired manner by the permanent magnet member 8 which is, by virtue of the cylindrical segments 10 and 12, insulated from the adverse effects of the highly localized field condition rotating with the rotor. While the drawing shows only a two pole stator it will be evident that the basic concept disclosed herein of a permanent magnet insulated from localized magnetic effects at a pole surface may be employed in the construction of permanent magnet stators having more than two poles.

The non-magnetic rotor cage structure shown in FIGURES 4 to 6 is particularly well adapted for use in combination with the permanent magnet stator structure described particularly for the reason that one of the rotor shafts and the rotor cage must rotate in a region of magnetic field strength and, further, must do so without power loss such as would occur if a magnetic material were employed giving rise to eddy currents and similar power loss. The bronze shaft 20, 22 does not extend through nor divide the armature winding. Thus there is obtained the advantage of a free and unimpeded path through which the magnetic lines of force can flow without interference. Further, the armature winding, when placed in the yoke, is between the side frames 28 and 30 and is thus protected from expansion or damage by centrifugal force when operating at high speeds.

It should be noted that while the arrangement shown in the drawings provides a simple two pole rotor, the concept involved may be employed in a multi pole rotor of the salient pole type in which each pole is formed with surfaces corresponding to the surfaces 44, 46 and 48 described in connection with FIGURE 2.

The particular construction of the brushes and commutator segments shown in the drawing may be modified by the utilization of numerous well known types of structures. It is essential, however, that the rotor brushes be circumferentially adjustable in order that they may be set in the optimum position giving rise to polarity change of the rotor coil at the most desirable time during rotor rotation.

While the foregoing discussion has viewed the motor as an alternating current machine, it will be evident that the motor may also be operated as a direct current machine if there is provided some suitable control of field strength in order to provide a motor speed control. When, however, the motor is employed as a direct current machine, the commutators will provide a number of segments dependent upon the number of rotor poles and the number of stator poles in order that the polarity of the rotor poles will be changed upon the passage of the poles over each successive stator pole face. These and other modifications may be made to the embodiment of the invention disclosed herein without departing from the scope of the invention as set forth in the following claims.

What is claimed is:

1. An alternating current motor comprising a stator, a rotor mounted for rotation within said stator, said stator comprising opposed magnetized cylindrical segments with adjacent segments being of opposite polarity and the inner surfaces of each of the segments being formed eccentrically with respect to the center of rotor rotation, said rotor comprising a coil, a magnetic core extending through said coil, said core having each end formed with a pair of relatively inclined surfaces meeting along a narrow circumferential surface extending substantially longitudinally of the rotor, the surface of each pair of surfaces extending generally in the direction of reducing radius of the stator surfaces forming a smaller angle with a tangent at the center of said narrow circumferential surface than is formed with said tangent by the other surface of each pair, and means supplying to said coil from an alternating current source a unidirectional power supply of one polarity during each portion of rotor rotation represented by one of said segments, said polarity reversing with successive segments.

2. An alternating current motor comprising a stator, a rotor mounted for rotation within said stator, said stator comprising opposed magnetic cylindrical segments with adjacent segments being of opposite polarity and the inner surfaces of each of the segments being formed eccentrically with respect to the center of rotor rotation, and means for magnetizing said magnetic segments, said rotor comprising a coil, a magnetic core extending through said coil, said core having each end formed with a pair of relatively inclined surfaces meeting along a narrow circumferential surface extending substantially longitudinally of the rotor, and means for connecting a source of power to said coil during substantially the complete cycle of rotation thereof.

3. An alternating current motor comprising a stator, a rotor mounted for rotation within said stator, said stator comprising opposed magnetic cylindrical segments with adjacent segments being of opposite polarity and the inner surfaces of each of the segments being formed eccentrically with respect to the center of rotor rotation, and permanent magnetic means for magnetizing said magnetic segments, said rotor comprising a coil, a magnetic core extending through said coil, said core having each end formed with a pair of relatively inclined surfaces meeting along a narrow circumferential surface extending substantially longitudinally of the rotor, and means for connecting a source of power to said coil during substantially the complete cycle of rotation thereof.

4. An alternating current motor comprising a stator, a rotor mounted for rotation within said stator, said stator comprising a pair of opposed magnetic cylindrical segments spaced along adjacent longitudinally extending edges and the inner surfaces of each of the segments being formed eccentrically with respect to the center of rotor rotation, a circular member abutting the longitudinal ends of said cylindrical segments, said member being magnetized with opposing polarities on opposite sides of a longitudinally extending plane passing through the radial center of the member, said member being positioned to impart one magnetic polarity to one of said cylindrical segments and to impart the opposite magnetic polarity to the other of said segments, said rotor comprising a coil, a magnetic core extending through said coil, said core having each end formed with a pair of relatively inclined surfaces meeting along a narrow circumferential surface extending substantially longitudinally of the rotor, and means for connecting a source of power to said coil intermittently during rotation past said segments.

5. An alternating current motor comprising a stator, a rotor including non-magnetic shaft means and mounted for rotation within said stator, said stator comprising a pair of opposed magnetic cylindrical segments spaced along adjacent longitudinally extending edges and the inner surfaces of each of the segments being formed eccentrically with respect to the center of rotor rotation, an annular member surrounding said shaft means and abutting the longitudinal ends of said cylindrical segments, said annular member being magnetized with opposing polarities on opposite sides of a longitudinally extending plane passing through the radial center of the member, said member being positioned to impart one magnetic polarity to one of said cylindrical segments and to impart the opposite magnetic polarity to the other of said segments, said rotor comprising a coil, a magnetic core extending through said coil, said core having each end formed with a pair of relatively inclined surfaces meeting along a narrow circumferential surface extending substantially longitudinally of the rotor, and a non-magnetic structure supporting said coil and core for rotation within said stator, said structure including shafts extending outwardly from said coil and core in axial alignment, means in said stator supporting said shafts for rotation, and means for connecting a source of power to said coil including a commutator having a plurality of pairs of segments rotating with said rotor and brushes fixed with said stator, successive segments of said commutator being connected to opposite ends of said rotor coil and spaced around the complete circumference of said rotor.

6. An alternating current motor comprising a stator, a rotor mounted for rotation within said stator, said stator comprising opposed magnetized cylindrical segments with adjacent segments being of opposite polarity and the inner surfaces of each of the segments being formed eccentrically with respect to the center of rotor rotation, said rotor comprising a coil, a magnetic core extending through said coil, said core having each end formed with a pair of relatively inclined surfaces meeting along a narrow circumferential surface extending substantially longitudinally of the rotor, and means for supplying to said coil a pulsating direct current of one polarity during a portion of rotation represented by one of said segments and a pulsating direct current of the opposite polarity during a portion of rotation represented by the next adjacent segment in the direction of rotation.

7. An alternating current motor comprising a stator, a rotor mounted for rotation within said stator, said stator comprising opposed magnetized cylindrical segments with adjacent segments being of opposite polarity and the inner surfaces of each of the segments being formed eccentrically with respect to the center of rotor rotation, said rotor comprising a coil, a magnetic core extending through said coil, said core having each end formed with a pair of relatively inclined surfaces meeting along a narrow circumferential surface extending substantially longitudinally of the rotor, the surface of each pair of surfaces extending generally in the direction of reducing radius of the stator surfaces forming a smaller angle with a tangent at the center of said narrow circumferential surface than is formed with said tangent by the other surface of each pair, and means for supplying to said coil a pulsating direct current of one polarity during a portion of rotation represented by one of said segments and a pulsating direct current of the opposite polarity during a portion of rotation represented by the next adjacent segment in the direction of rotation.

8. An alternating current motor comprising a stator, a rotor mounted for rotation within said stator, said stator comprising opposed magnetic cylindrical segments with adjacent segments being of opposite polarity and the inner surfaces of each of the segments being formed eccentrically with respect to the center of rotor rotation, and means for magnetizing said magnetic segments, said rotor comprising a coil, a magnetic core extending through said coil, said core having each end formed with a pair of relatively inclined surfaces meeting along a narrow circumferential surface extending substantially longitudinally of the rotor, and means for supplying to said coil a pulsating direct current of one polarity during a portion of rotation represented by one of said segments and a pulsating direct current of the opposite polarity during a portion of rotation represented by the next adjacent segment in the direction of rotation.

9. An alternating current motor comprising a stator, a rotor mounted for rotation within said stator, said stator comprising opposed magnetized cylindrical segments with adjacent segments being of opposite polarity and the inner surfaces of each of the segments being formed eccentrically with respect to the center of rotor rotation, said rotor comprising a coil, a magnetic core extending through said coil, said core having each end formed with a pair of relatively inclined surfaces meeting along a narrow circumferential surface extending substantially longitudinally of the rotor, and means for supplying to said coil a plurality of pulses of direct current having the same polarity during a portion of rotation represented by one of said segments and a plurality of pulses of opposite polarity during a portion of rotation represented by the next adjacent segment in the direction of rotation.

References Cited in the file of this patent

UNITED STATES PATENTS

| | | |
|---|---|---|
| 1,250,752 | Alexanderson | Dec. 18, 1917 |
| 1,379,953 | Adreino | May 31, 1927 |
| 2,070,790 | Hammes | Feb. 16, 1937 |
| 2,199,948 | Brockway | May 7, 1940 |
| 2,387,016 | Hall | Oct. 16, 1945 |